F. McDANIELS.
RESTRAINING DEVICE.
APPLICATION FILED JUNE 1, 1916.
1,217,034.
Patented Feb. 20, 1917.
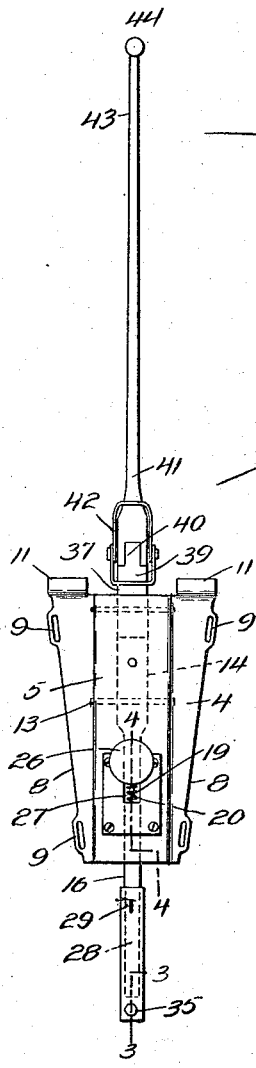
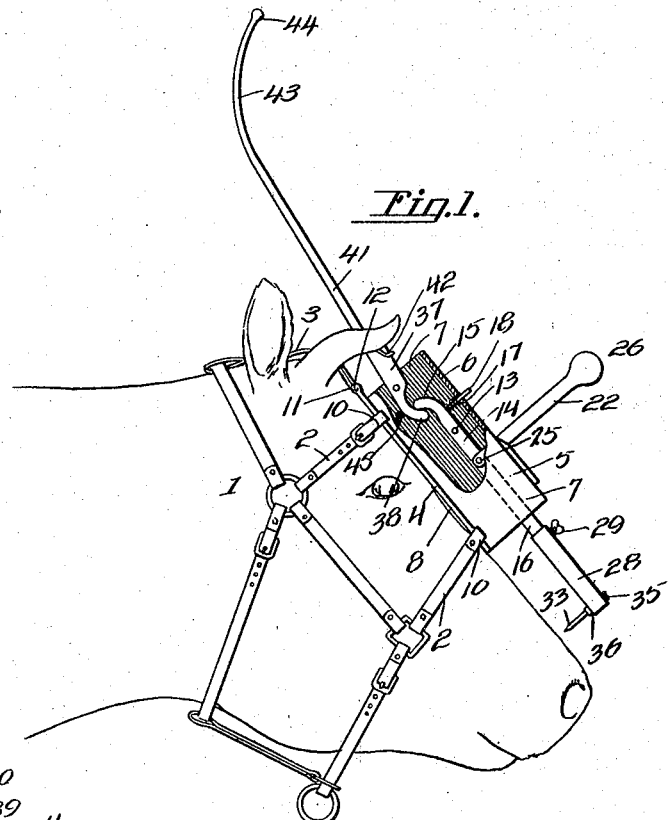
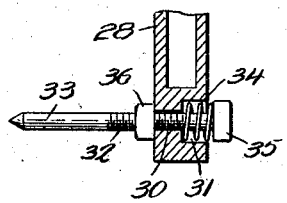
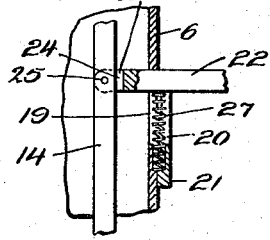
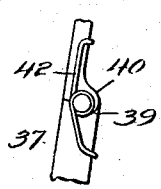
Inventor
Frank McDaniels,
Witnesses
F. C. Gibson.
Frank Hough.
By Victor J. Evans
Attorney

UNITED STATES PATENT OFFICE.

FRANK McDANIELS, OF HARLEM, MONTANA.

RESTRAINING DEVICE.

1,217,034.      Specification of Letters Patent.      Patented Feb. 20, 1917.

Application filed June 1, 1916. Serial No. 101,178.

*To all whom it may concern:*

Be it known that I, FRANK McDANIELS, a citizen of the United States, residing at Harlem, in the county of Blaine and State of Montana, have invented new and useful Improvements in Restraining Devices, of which the following is a specification.

This invention relates to a restraining device for cattle and more particularly to a device which is so constructed that it is especially adapted for use upon cows or calves.

The primary object of the invention is to provide a restraining device which may be easily and quickly applied to the head of an animal and will prevent the most obstreperous animal from escaping from an inclosure or damaging property.

Another object of the invention is to provide a restraining device of the class described which when applied to the head of a calf will enable the calf to be weaned.

With these and other objects in view, the invention resides in the novel combination and arrangement of parts, which will be hereinafter described and particularly pointed out in the claims.

The preferred embodiment of the invention has been illustrated in the accompanying drawing, although no restriction is necessarily made to the precise details of construction therein shown, as changes, alterations, and modifications, within the scope of the claims may be resorted to when desired.

Like characters of reference denote corresponding parts throughout the several views in the drawing, in which:

Figure 1 is a side elevation partly in section of the restraining device showing the same applied to the head of an animal.

Fig. 2 is a front view of the restraining device with the head stall removed.

Fig. 3 is an enlarged fragmentary vertical sectional view on the line 3—3 of Fig. 2.

Fig. 4 is an enlarged fragmentary sectional view on the line 4—4 of Fig. 2.

Fig. 5 is a detailed view of a portion of the restraining device.

Referring now to the drawing in detail, the numeral 1 designates a head stall forming part of the restraining device and shown applied to the head of an animal in Fig. 1 in the drawing, said head stall having cheek straps 2 and a head strap 3.

A plate 4 which is formed from any suitable material is channeled longitudinally throughout its length to form a housing 5 having a front wall 6 and side walls 7. The side edges 8 of the plate 4 converge toward one end of the plate, so that the plate has a greater width at one end than at the other which enables the plate to more closely conform to the shape of the face of the animal with which it is adapted to contact.

The plate 4 has formed therein near the side edges 8 spaced openings 9 receiving the loops 10 at one end of the cheek straps 2 of the head stall 1.

One end of the plate 4 is rolled upon opposite sides of the housing 5 to form sleeves 11 in which is received a pin 12 with which is connected the loop on one end of the head straps 3, said head straps and cheek straps securing the face plate 4 to the head stall 1.

A fulcrum pin 13 extends transversely of the housing 5 and has its ends mounted to turn in the side walls 8. A rod 14 extends within the housing 5 for a portion of its length and has passing therethrough near one end the pin 13, said end being enlarged and curved to form an operating head 15, the other end 16 of the rod 14 extending beyond one end of the housing 5.

A coiled expansion-spring 17 encircles a pin 18 received in an opening in the front wall 6 of the housing 5, said spring holding an end on the pin against the curved operating head 15 of the rod 14 so that the pin normally exerts an influence on the head 15 to turn the rod about its pivotal connection with the side walls 7 of the housing in one direction.

The front wall 6 of the housing 5 has formed therein a longitudinally extending slot 19 registering with a similar slot 20 in a channeled plate 21 secured to the front wall 6 of the housing 5.

A push bar 22 has one end disposed in the housing 5 and forked, as at 23, to form arms 24 between which is received the rod 14 below its connection with the fulcrum pin 13, said bar 14 being pivotally connected with the arms 24 by a pivot pin 25 passing through said arms and bar.

The other end of the push bar 22 is enlarged, as at 26, to form a ball-shaped operating head which when brought into contact with an obstruction will turn the rod 14 about its pivotal connection with the side walls 7 of the housing 5 against the influence of the spring 17.

A coiled expansion spring 27 is received in the channel in the plate 21 and has one end bearing against the push bar 22, said spring serving as a yieldable support for the push bar 22 and normally serving to hold the same in a horizontal position yet allowing the bar 22 to be turned about its pivotal connection with the rod 14 in a downward direction when the head 26 is brought into contact with an obstruction.

A hollow sleeve 28 which is substantially square in cross section is mounted upon the end 16 of the rod 14 which extends beyond the housing 5 and is adjustably mounted thereon by means of winged bolts 29.

The sleeve 28 has formed therein near one end a transversely extending bore 30 enlarged for a portion of its length, as at 31, and has mounted therein for sliding movement the threaded shank 32 of a piercing pin or prod 33.

A coiled spring 34 encircles the shank 32 and is received in the enlarged portion 31 of the bore 30, said spring having an end bearing against a head 35 on the pin or prod and normally serving to hold a nut 36 threadedly mounted on the shank 32 against the sleeve 28.

By turning the shank 32 of the piercing pin or prod 33 within the nut 36, the distance which the pointed end of the shank extends beyond the nut may be increased or diminished, the spring 34 serving to yieldably hold the nut 36 against the sleeve 28, so that when the head 35 of the piercing pin or prod 33 is brought into contact with an obstruction, the shank 32 will be moved longitudinally of the bore 30.

A lever 37 has one end disposed in the housing 5, said end being curved to form a head 38 for contact with the operating head 15 on the rod 14, the lever 37 being pivotally connected between its ends with the side wall 8 of the housing 5 above the fulcrum pin 13.

The end 39 of the lever 37 which extends beyond an end on the housing 5 has connected therewith by means of a knuckle joint 40 one end of an arm 41, said arm being normally held in extended position by a spring 42 having its respective terminals contacting with the arm 41 and the extending end of the lever 37. The other end of the arm 41 is curved, as at 43, said curved portion terminating at one end in a head 44.

A spring 45 is connected with the plate 4 and has one end bearing against the head 38 on the lever 37, said spring co-acting with the spring 17 in normally holding the arm 41 in an inclined position above the housing 5 with the head 44 on the arm extending beyond the front wall 6 of the housing.

Through the above described manner of mounting the lever 37 in the housing 5, it will be seen that when the head 44 is brought into contact with an obstruction, the lever will be turned about its pivotal connection with the housing 5, such movement causing the head 38 through its contact with the operating head 15 to rock the rod 14 and cause the piercing pin or prod 33 to be brought into contact with the nose of the animal to whose head the restraining device is attached.

When the restraining device has been applied to the head of an animal by means of the head stall 1 and the animal moves its head to cause the head on the push bar 22 to contact with an obstruction, the rod 14 is turned about its pivotal connection with the housing 5 against the influence of the spring 17, such turning movement causing the piercing pin or prod 33 to contact with the nose of the animal.

As the spring 17 is compressed by the head 15 on the rod 14, the head 38 on the lever 37 is still held in contact with the head 15 by the spring 45 so that if the head 44 is brought into contact with an obstruction the bar 14 will be still further turned about its pivotal connection with the housing 5 and cause the piercing pin to enter more deeply into the animal's nose.

It will, of course, be understood that when neither the head 44 nor the head 26 is in contact with an obstruction, the springs 45, 17, and 27 hold the rod 14 and arm 41 in their normal position.

If the animal in its endeavor to escape from an inclosure should pass the arm 41 between the rails or wires of a fence, it will be seen that the pressure of the rails or wires upon the back of the arm 41 will cause the same to turn about its hinged connection with the lever 37, so that the arm 41 will not be bent or broken or the animal become entangled in the fence.

When the device has been applied to the head of a calf, it will be seen that the arm 41, push bar 22, and head 35 on the piercing pin or prod 33 will prevent the calf from feeding by causing the piercing pin to enter the animal's nose when brought into contact with an obstruction thus adapting the device to be advantageously used as a calf weaner.

From the foregoing description, taken in connection with the accompanying drawing, it is at once apparent that a restraining device has been provided which through its improved construction is highly efficient in use.

Having thus described the invention, what is claimed as new, is:

1. In a device of the class described, the combination with a head stall, of a plate connected therewith and provided with a channel forming a housing, a rod received in said housing for a portion of its length and pivotally connected therewith, a sleeve connected with said rod exteriorly of the housing and provided with a piercing pin, a push bar having an end received within said housing and pivotally connected with the rod, a lever pivotally connected with the housing between its ends and having a curved head engageable with an end on said rod, means for holding the end on the rod in engagement with the head on the lever, an arm hingedly connected with the lever, and means for holding said arm in extended position.

2. In a device of the class described, the combination with a head stall, of a plate connected therewith and provided with a channel forming a housing extending longitudinally thereof, a lever pivotally connected with the housing and having a curved end forming a head, an arm mounted to turn on said lever and normally held in extended position, a rod pivotally connected with the housing and having a curved end engaged with the head on the lever, a push bar pivotally connected with said rod and extending beyond the housing, a sleeve adjustably mounted on the rod, and a piercing pin adjustably mounted in the sleeve.

In testimony whereof I affix my signature.

FRANK McDANIELS.

Copies of this patent may be obtained for five cents each, by addressing the "Commissioner of Patents, Washington, D. C."